United States Patent
Liu et al.

(10) Patent No.: US 8,799,546 B2
(45) Date of Patent: Aug. 5, 2014

(54) METHOD AND APPARATUS FOR MONITORING SINGLE BOARD RUNNING STATE

(75) Inventors: Zhongwen Liu, Shenzhen (CN); Zejian Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 265 days.

(21) Appl. No.: 13/390,162

(22) PCT Filed: Jun. 11, 2010

(86) PCT No.: PCT/CN2010/073838
§ 371 (c)(1),
(2), (4) Date: Feb. 13, 2012

(87) PCT Pub. No.: WO2011/017975
PCT Pub. Date: Feb. 17, 2011

(65) Prior Publication Data
US 2012/0144080 A1     Jun. 7, 2012

(51) Int. Cl.
*G06F 13/00* (2006.01)

(52) U.S. Cl.
USPC ............................ 710/110; 710/301

(58) Field of Classification Search
USPC .......................... 710/110, 300, 301
See application file for complete search history.

(56) References Cited

U.S. PATENT DOCUMENTS

| | | | |
|---|---|---|---|
| 7,751,333 B2 * | 7/2010 | Campini et al. | 370/241 |
| 2005/0091438 A1 * | 4/2005 | Chatterjee | 710/315 |
| 2009/0006659 A1 | 1/2009 | Collins et al. | |
| 2009/0251867 A1 * | 10/2009 | Sharma et al. | 361/737 |

FOREIGN PATENT DOCUMENTS

| | | |
|---|---|---|
| CN | 1983987 | 6/2007 |
| CN | 101017377 | 8/2007 |
| CN | 101500249 | 8/2009 |
| CN | 101631345 | 1/2010 |
| WO | WO 2008/107935 | 9/2008 |

OTHER PUBLICATIONS

A Supplementary European Search Report dated Feb. 27, 2013, which issued during the prosecution of EP Patent Application No. 10807920.
Bradford G. Van Treuren, "JTAG System Test in a MicroTCA World". International Test Conference, 2007. XP031207039. ISBN: 978-1-4244-1127-6.
An Office Action dated Apr. 25, 2011, which issued during the prosecution of Chinese Patent Application No. 200910163690.1.

* cited by examiner

*Primary Examiner* — Glenn A Auve
(74) *Attorney, Agent, or Firm* — Diedericks & Whitelaw PLC

(57) ABSTRACT

A method and an apparatus for monitoring single board running state are disclosed in the present invention. The above method comprises: establishing an Module Management Controller (MMC) communication channel between a slave board and a master control board when the slave board is powered up; and the slave board reporting running state information of the slave board to the master control board by the MMC communication channel according to one or more preset monitor information points. In the present invention, by the MMC function channel under the uTCA architecture, the slave board reports the master control board the running state of the working process from the moment of being powered-up to the time when the system runs stably, which solves the problem in the conventional art that the monitoring on the single aboard is incomprehensive and can record the running state of the slave board completely.

8 Claims, 5 Drawing Sheets

METHOD AND APPARATUS FOR MONITORING SINGLE BOARD RUNNING STATE

Cross-Reference to Related Applications

This application represents a National Stage application of PCT/CN2010/073838 entitled "Method and Device for Monitoring Running State of Card" filed Jun. 11, 2010, pending.

FIELD OF THE INVENTION

The present invention relates to communication field, and in particular to a method and an apparatus for monitoring single board running state.

BACKGROUND OF THE INVENTION

Currently, series of base stations of wireless communication use the Micro Telecom Computing Architecture (uTCA) increasingly and perform communication work by using the inter-coordination between the master control board and the slave board. In the base station system of a wireless communication system, monitoring the whole running process of the base station is critical. By monitoring the running process, the single board and system condition can be controlled to the greatest extent, providing troubleshooting basis for technical personnel and users. When a part of the single board have broken down, for example, it does not work after being powered up and the system cannot load normally and so on, it is required to know what degree the single board runs to and what step is executed where the problem lies. Therefore, during the running of the system, monitoring single board running state, as soon as possible and as much as possible, has important meaning to system maintenance.

According to the conventional art, the powered-up running state of the single board is recorded after system initialization, and the monitoring is carried out by a monitoring process, for example, the recording is carried out by using black box technology or single board alerting. However, all these technologies are carried out on the basis of the operating system or by using the functions of the operating system after the single board is powered up successfully, but when the single board breaks down during the power-up process, and the power-up initialization is not completed so the operating system cannot be accessed, these monitoring means will not work. If the power-up of the single board breaks down, the tools or devices that other monitoring means are dependent on have not been initialized yet, and since the monitoring mechanism itself has not been built up, the single board running state during this time period cannot be monitored. When the structure of the system itself is simple and the environmental resources are not enough to provide some communication modes such as network port and so on, monitoring is also very difficult. At the same time, under uTCA architecture, each of the slave boards reports the information by the network port, and once the network port appears abnormal, it will cause all the information fails to be reported.

Therefore, in order to monitor the running process of the system single board more comprehensively, the monitoring has to be carried out since the single board is powered up. However, no effective solution has been proposed in the conventional art.

SUMMARY OF THE INVENTION

The present invention is made upon considering the problem that the monitoring on the single board in the conventional art is incomprehensive, and for this end, the main object of the present invention is to provide a method and an apparatus for monitoring single board running state, so as to solve the above problems in the conventional art.

A method for monitoring single board running state is provided according to one aspect of the present invention.

The method according to the present invention comprises: establishing an Module Management Controller (MMC) communication channel between a slave board and a master control board when the slave board is powered up; and the slave board reporting running state information of the slave board to the master control board by the MMC communication channel according to one or more preset monitor information points.

Preferably, the step of the slave board reporting the running state information of the slave board to the master control board by the MMC communication channel further comprises: the slave board sending the running state information of the slave board to an MMC; and the MMC forwarding the running state information of the slave board to the master control board by an Intelligent Platform Management Interface (IPMI) channel.

Preferably, the step of the slave board sending the running state information of the slave board to the MMC further comprises: the slave board sending the running state information to the MMC by writing CPU serial port register when the initialization of a serial port which is used to communicate between the slave board and the MMC has been not completed; and the slave board sending the running state information to the MMC by invoking a standard writing interface when the initialization of the serial port which is used to communicate between the slave board and the MMC has been completed.

Preferably, when the slave board sends the running state information of the slave board to the MMC, a preset time delay is added; and/or the running state information of the slave board is less than 20 bytes.

Preferably, the monitor information points are used to indicate the running state of the running stages of the slave board, wherein the running stages comprise at least one of the following: an assembly code running stage, a CPU-minimum-support system running stage, a boot extended application execution stage, a single board control running stage and an upper applications running stage.

An apparatus for monitoring single board running state is also provided according to another aspect of the present invention.

The apparatus according to the present invention comprises: an establishment module, configured to establish an MMC communication channel between a slave board and a master control board when the slave board is powered up; and a reporting module, configured to report running state information of the slave board to the master control board by the MMC communication channel according to one or more preset monitor information points.

Preferably, the reporting module further comprises: a first reporting sub-module, configured to send the running state information of the slave board to an MMC; and a second reporting sub-module, configured for the MMC to forward the running state information of the slave board to the master control board through an 1PMI channel.

Preferably, the first reporting sub-module sends the running state information to the MMC by writing CPU serial port register or by invoking a standard writing interface.

Preferably, the apparatus further comprises: a setting module, configured to preset one or more monitor information points, wherein the monitor information point is used to indicate the running state of the running stages of the slave board, wherein the running stages comprise at least one of the following: an assembly code running stage, a CPU-minimum-support system running stage, a boot extended application execution stage, a single board control running stage and an upper applications running stage.

According to the above technical solution of the present invention, by the MMC function channel of the uTAC architecture, the slave board reports the master control board the running state of the working process from the moment of being powered-up to the time when the system runs stably, which solves the problem in the conventional art that the monitoring on the single board is incomprehensive and can record the running state of the slave board completely, so that the running state of the slave board can still be gathered in the case that the conventional monitoring means are not effective, and it has important meaning for being referenced in system maintain and troubleshooting.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention. In the drawings.

DETAILED DESCRIPTION OF EMBODIMENTS

The main idea of the present invention mainly lies in the following: by using the Module Management Controller (MMC) functional channel under the uTCA architecture, the slave board reports the master control board the running state of the working process from the moment of being powered-up to the time when the system runs stably, which solves the problem in the conventional art that the monitoring on the single board is incomprehensive. By the present invention, the running state of the slave board can be recorded completed, and it has important meaning for being referenced by system maintain and troubleshooting. It is needed to note that the present invention is not only suitable for the base station systems with Code-Division Multiple Access (CDMA) digital wireless technology, but also suitable for the wireless communication base station systems with other communication systems, such as World Interoperability for Microwave Access (WiMAX), Time Division-Synchronous CDMA (TD-SCDMA), Wideband CDMA (WCDMA), Global System for Mobile Communications (GSM) and so on.

For clearer understanding of the objects, technical solutions and advantages of the present invention, the present invention will be further described in detail hereinbelow with reference to the accompanying drawings and particular embodiments.

Method Embodiments

Figure 1:
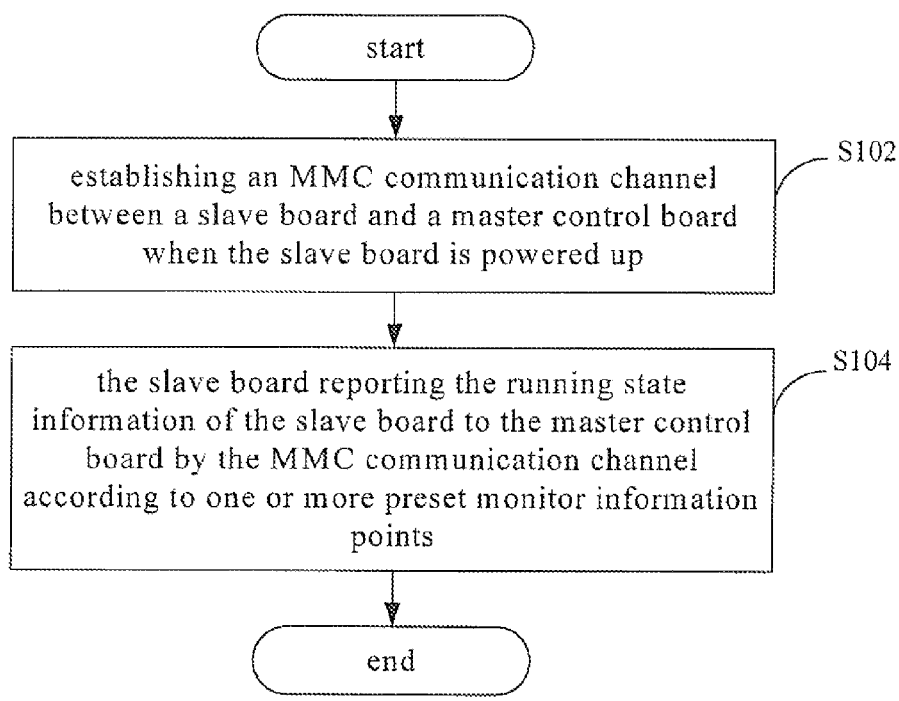
FIG. 1 is a flowchart of a method for monitoring single board running state according to the embodiments of the present invention.

A method for monitoring single board running state is proposed according to the embodiments of the present invention. FIG. 1 is a flowchart of a method for monitoring single board running state according to the embodiments of the present invention. As shown in FIG. 1, the method comprises:

Step S102, establishing an MMC communication channel between a slave board and a master control board when the slave board is powered up; and Step S104, the slave board reporting the running state information of the slave board to the master control board by the MMC communication channel according to one or more preset monitor information points.

Figure 2:
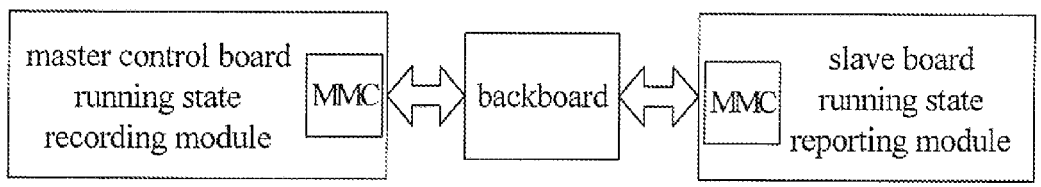
FIG. 2 is a schematic diagram of the frame architectures of a master control board and a slave board according to the embodiments of the present invention.

In order to make the slave board report the running state information as early as possible, it is needed to establish a reporting channel to the master control board at the beginning of the slave board being powered up. Therefore, the MMC communication channel should be initialized when the single board executes the assembly code immediately after being powered up. In particular, the serial port which communicates with the MMC is initialized by the assembly code, so that it is guaranteed that the slave board can report the running state information thereof completely. On the slave board, after having received the data, the MMC parses the received data and forwards it to the master control board by an Intelligent Platform Management Interface (IPMI) channel. The frame architectures of the master control board and the slave board can be known by referring to FIG. 2, the master control board communicates with the slave board via a backboard, and a running state reporting module of the slave board reports the running state data to a running state recording module of the master control board.

Figure 3:
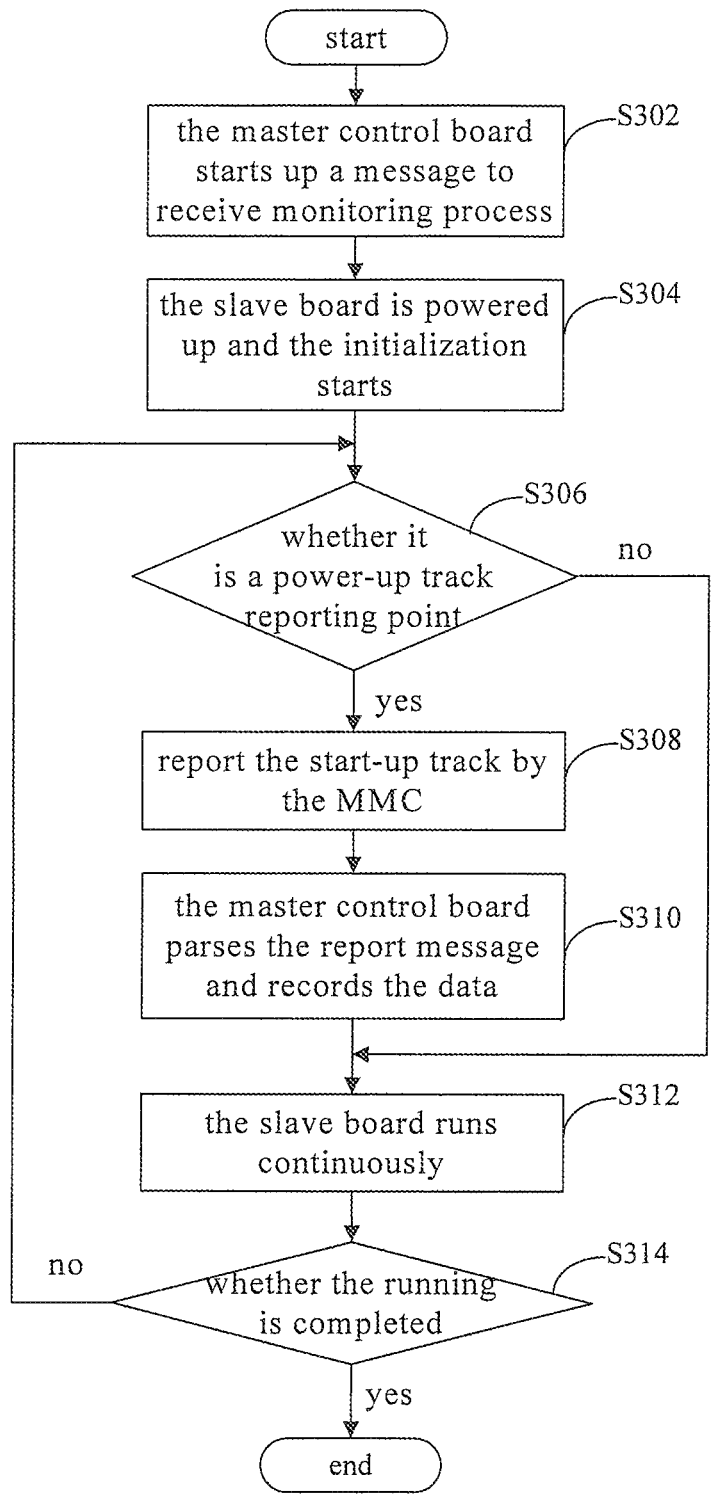
FIG. 3 is a flowchart of a preferred processing solution of the method for monitoring single board running state according to the embodiments of the present invention.

FIG. 3 is a flowchart of a preferred processing solution of the method for monitoring single board running state according to the embodiments of the present invention. As shown in FIG. 3, the processing comprises the following steps.

Step S302, the master control board starts up a message to receive monitoring process, and prepares for receiving the running state data reported from the slave board at any time, then guarantees the smoothness and accuracy of the MMC communication channel between the master control board and the slave board, and ensures that the master control board has certain resources (such as storage space, task scheduling execution, etc.), in order to get ready for the preparation work of the monitoring process.

Step S304, the slave board is powdered up and the initialization starts.

Figure 4:
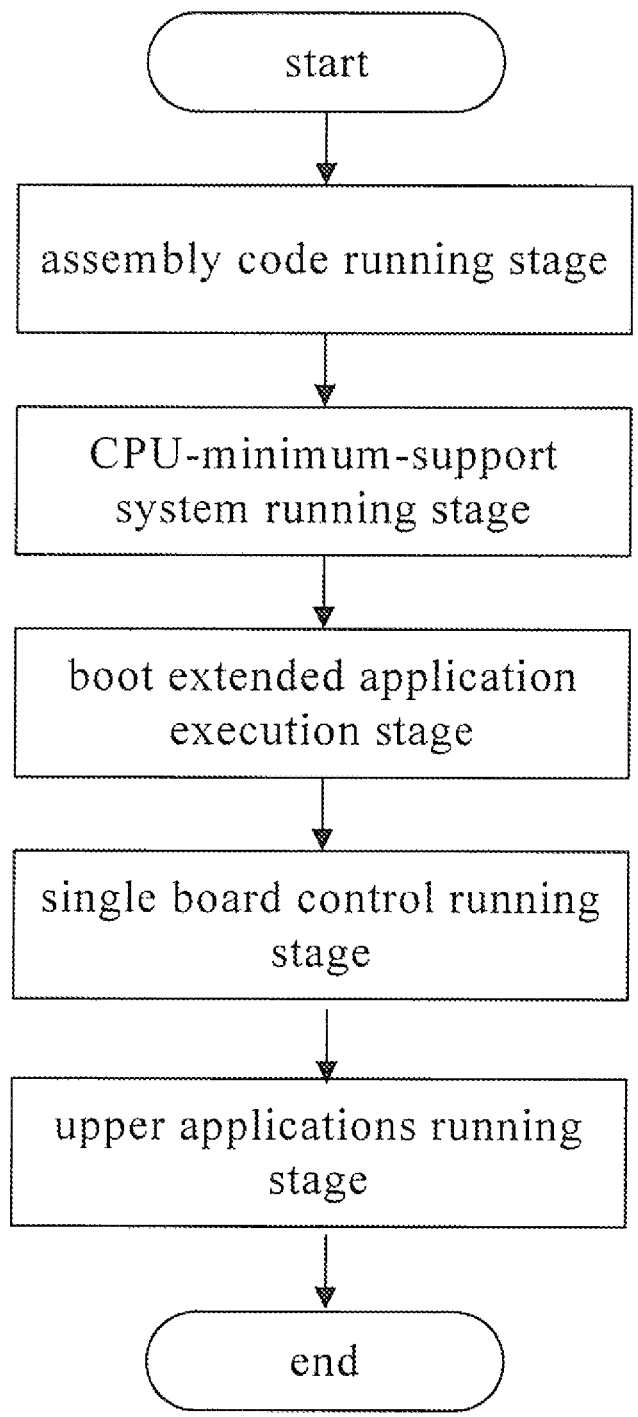
FIG. 4 is a flowchart of running stages of a single board according to the embodiments of the present invention.

Step S306, determining whether the information of the monitor information points is reported. The single board running state can be divided into several stages, and referring to FIG. 4, the single board running state comprises: an assembly code running stage, a CPU-minimum-support system running stage, a boot extended application execution stage, a single board control running stage and an upper applications running stage. According to the monitoring requirements, one or more monitory points can be arranged at each stage, so as to monitor various running conditions of the single board. The general reporting procedure is: starting reporting the start-up state since executing the assembly code initialization at the being-powered-up stage, and then selecting a start-up point to send data to the MMC during the booting of the Boot application program. Analogically, some specific stage points are selected to report the start-up state at the single board control stage and the upper applications program stage. Certainly, as to the running stage in which the monitoring is not needed, it is also possible not to set the monitor information points.

Step S308, the start-up track of the monitor information points is reported by the MMC, and the. MMC parses the received message, and then reports the message data to the master control board by the IPMI channel.

Step S310, after having received the data, a message receiving process which resides on the master control board parses the data and records the data into a corresponding database.

Step S312, the slave board runs continuously.

Step S314, determining whether the running of the slave board is completed, wherein if the running of the slave board not completed, then Step S306 is performed, otherwise this process is ended.

The slave board has some Power On Self Test (POST) during the powered start-up process, and the results of the POST will also be reported to the master control board together with the message. If the start-up of the slave board being powered is successful, then there are complete running state records and various detection results in the start-up records; and if the start-up is failed, then the recording will be persisted until the last moment before the start-up fails, and some POST results of this duration will be recorded. After the above processing, the user invokes a corresponding command to look over the database on the master control board, which can look up the track of the whole start-up process of the corresponding slave board. The records of the track can be marked by using a series of code flag, and when it is required to know the specific contents, it is only needed to compare the recorded code flag and the corresponding reference table.

Figure 5:
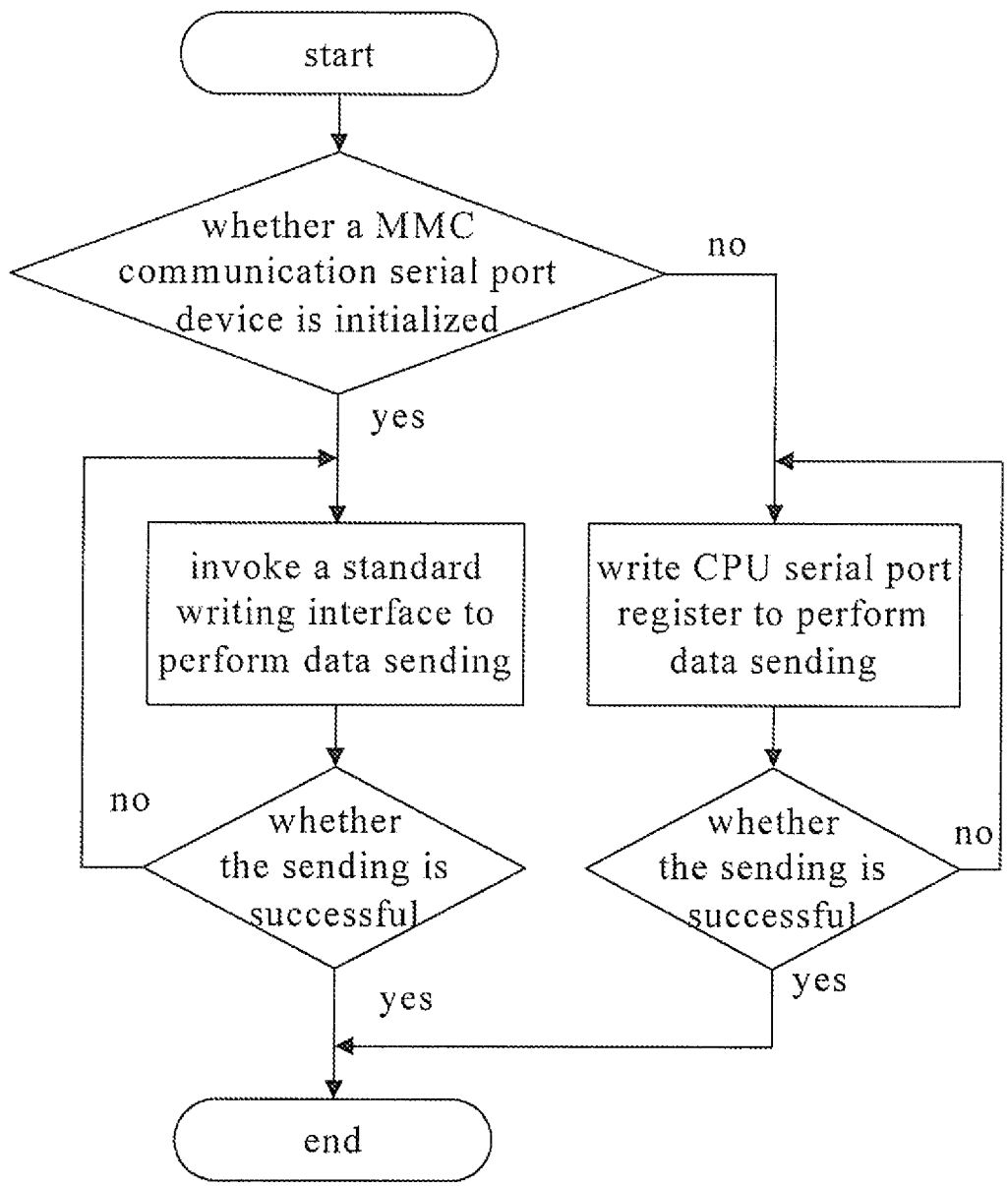
FIG. 5 is a flowchart of MMC communication according to the embodiments of the present invention.

It is needed to note that since the CPU serial port cache buffer is small, in order to avoid the data from being covered before being sent out, the data frame format sent by the slave board to the MMC should be as simple as possible, and certain time delay should be added when writing data to the serial port. FIG. 5 is a flowchart of MMC communication according to the embodiments of the present invention, and referring to FIG. 5, at the later stage of the single board being started-up, after the MMC communication serial port device is initialized, the serial port will be initialized as a standard I/O device to perform the read and writing; at this moment, the serial port cannot be directly operated by writing CPU register again, but data needs to be sent to the serial port through a writing Application Programming Interface(API). Preferably, the length of data frames sent by the slave board to the MMC should be less than 20 bytes.

By the above embodiments; the running state of the single board from the moment of being powered-up to the time when the whole system works stably can be monitored quite comprehensively, which forms a link-monitor means and can fill up some blank stages of single board monitoring in the conventional art. The embodiments of the present invention skilfully use the MMC function channel in the uTCA architecture, such that the running state of the slave board can still be gathered in the case that the conventional channel is not effective.

Apparatus Embodiments

According to the embodiments of the present invention, an apparatus for monitoring single board running state is provided. The apparatus can be used to realize the method for monitoring single board running state which is provided by the above method embodiments.

Figure 6:
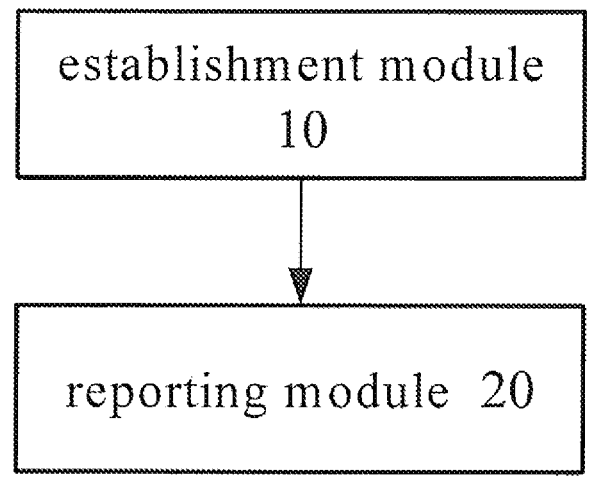
FIG. 6 is a block diagram of an apparatus for monitoring single board running state according to the system embodiments of the present invention.
Figure 7:
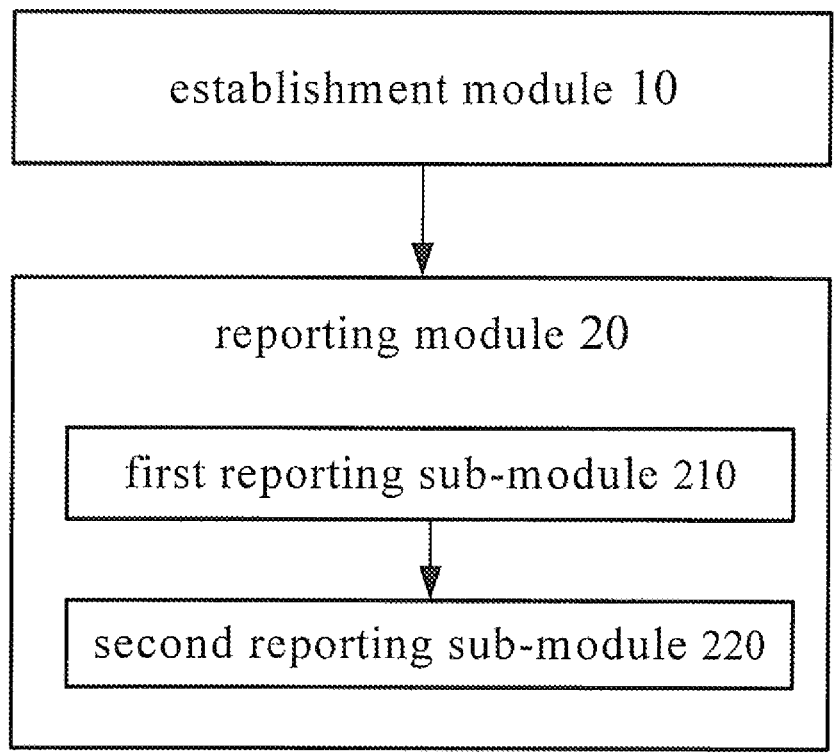
FIG. 7 is a block diagram of the preferred structure of the apparatus for monitoring single board running state according to the system embodiments of the present invention.

FIG. 6 is a block diagram of an apparatus for monitoring single board running state according to the system embodiments of the present invention, and FIG. 7 is a block diagram of the preferred structure of the apparatus for monitoring single board running state according to the system embodiments of the present invention.

As shown in FIG. 6, the apparatus for monitoring single board running state according to the embodiments of the present invention comprises: an establishment module 10 and a reporting module 20. In the case, the establishment module 10 is configured to establish an MMC communication channel between a slave board and a master control board when the slave board is powered up; and the reporting module 20, connected to the establishment module 10, is configured to report the running state information of the slave board to the master control board by the MMC communication channel according to one or more preset monitor information points.

As shown in FIG. 7, based on the structure shown in FIG. 6, the reporting module 20 further comprises: a first reporting sub-module 210, configured to send the running state information of the slave board to the MMC; and a second reporting sub-module 220, configured for the MMC to forward the running state information of the slave board to the master control board through an IPMI channel. In the case, the first reporting sub-module 210 sends the running state information to the MMC by writing CPU serial port register or by invoking a standard writing interface. Particularly, the first reporting sub-module 210 operates the serial port by writing CPU register at the early stage of the single board's start-up, and the first reporting sub-module 210 sends data to the serial port of the MMC by invoking the standard writing interface at the later stage of the single board's start-up.

It can be known from the above description that: preferably, the first reporting sub-module 210 is located at the slave board; and the second reporting sub-module 220 is located at MMC. During the process that the first reporting sub-module 210 sends data to the second reporting sub-module 220, the data frame has to be as simple as possible and is preferably less than 20 bytes, and when sending the data, certain data delay may be added to avoid the running state data from being deleted before being sent out. The apparatus for monitoring single board running state according to this embodiment can also comprise a running state recording module, located at the master control board and connected to the second reporting sub-module 220, which is configured to receive the running state data reported by the second reporting sub-module 220.

In addition, the apparatus can further comprise: a setting module (not shown), configured to preset one or more monitor information points, wherein the monitor information points are used to indicate the running state of the running stages of the slave board, wherein the running stages comprises at least one of the following: an assembly code running stage, a CPU-minimum-support system running stage, a boot extended application execution stage, a single board control running stage and an upper applications running stage.

In the specific implementation, the specific working procedure of the apparatus for monitoring single board running state provided by the embodiments of the present invention can be known referring to the procedures shown in FIGS. 1 to 5.

In summary, according to the above technical solution of the present invention, by the MMC function channel under the uTCA architecture, the slave board reports the master control board the running state of the working process from the moment of being powered-up to the time when the system runs stably, which solves the problem in the conventional art that the monitoring on the single aboard is incomprehensive, and can record the running state of the slave board completely, so that the running state of the slave board can still be gathered in the case that the conventional channel is not effective, and it has important meaning for being referenced by system maintain and troubleshooting.

Above, description is only to illustrate the preferred embodiments but not to limit the present invention. Various alterations and changes to the present invention are apparent to those skilled in the art. The scope defined in claims shall cover any modification, equivalent substitution and improvement within the spirit and principle of the present invention.

What is claimed is:

1. A method for monitoring a running state of a single board, comprising:
    establishing an Module Management Controller (MMC) communication channel between a slave board and a master control board when the slave board is powered up; and
    the slave board reporting running state information of the slave board to the master control board by the MMC communication channel according to one or more preset monitor information points;
    wherein the monitor information points are used to indicate the running state of running stages of the slave board, wherein the running stages comprises at least one of the following:
    an assembly code running stage, a CPU-minimum-support system running stage, a boot extended application execution stage, a single board control running stage and an upper applications running stage.

2. The method according to claim 1, wherein the step of the slave board reporting running state information of the slave board to the master control board by the MMC communication channel further comprises:
    the slave board sending the running state information of the slave board to an MMC; and
    the MMC forwarding the running state information of the slave board to the master control board by an Intelligent Platform Management Interface (IPMI) channel.

3. The method according to claim 2, wherein the step of the slave board sending the running state information of the slave board to the MMC further comprises:
    the slave board sending the running state information to the MMC by writing a serial port register of a CPU when an initialization of a serial port which is used to communicate between the slave board and the MMC has been not completed; and
    the slave board sending the running state information to the MMC by invoking a standard writing interface when the initialization of the serial port which is used to communicate between the slave board and the MMC has been completed.

4. The method according to claim 2, wherein a preset time delay is added when the slave board sends the running state information of the slave board to the MMC.

5. The method according to claim 2, wherein the running state information of the slave board is less than 20 bytes.

6. An apparatus for monitoring a running state of a single board, comprising:
    an establishment module, configured to establish an MMC communication channel between a slave board and a master control board when the slave board is powered up;
    a reporting module, configured to report running state information of the slave board to the master control board by the MMC communication channel according to one or more preset monitor information points; and
    a setting module, configured to preset one or more monitor information points, wherein the one of more monitor information points is used to indicate the running state of running stages of the slave board, wherein the running stages comprises at least one of the following: an assembly code running stage, a CPU-minimum-support system running stage, a boot extended application execution stage, a single board control running stage and an upper applications running stage.

7. The apparatus according to claim 6, wherein the reporting module further comprises:
    a first reporting sub-module, configured to send the running state information of the slave board to the MMC; and
    a second reporting sub-module, configured for the MMC to forward the running state information of the slave board to the master control board through an IPMI channel.

8. The apparatus according to claim 7, wherein the first reporting sub-module sends the running state information to the MMC by writing a serial port register of a CPU or by invoking a standard writing interface.

* * * * *